United States Patent [19]

Iijima et al.

[11] 4,124,509
[45] Nov. 7, 1978

[54] HAEMODIALYZER EMPLOYING HOLLOW FIBERS

[75] Inventors: Seiichi Iijima, Kokubunji; Akikazu Hazama, Tokyo, both of Japan

[73] Assignee: Asahi Medical Co., Ltd., Tokyo, Japan

[21] Appl. No.: 787,562

[22] Filed: Apr. 14, 1977

[30] Foreign Application Priority Data

Apr. 21, 1976 [JP] Japan .............................. 51-48873[U]

[51] Int. Cl.² .............................................. B01D 31/00
[52] U.S. Cl. .................................. 210/321 B; 210/456
[58] Field of Search ................. 210/22, 321 A, 321 B, 210/321 R, 456

[56] References Cited

U.S. PATENT DOCUMENTS

| | | | |
|---|---|---|---|
| 3,276,996 | 10/1966 | Lazare | 210/22 |
| 3,728,256 | 4/1973 | Cooper | 210/456 X |
| 3,778,369 | 12/1973 | Markley | 210/456 X |
| 4,025,436 | 5/1977 | Tsuda et al. | 210/321 A |

*Primary Examiner*—Frank A. Spear, Jr.
*Attorney, Agent, or Firm*—Armstrong, Nikaido, Marmelstein & Kubovcik

[57] ABSTRACT

A haemodialyzer for use in a haemodialysis equipment of partial recirculation type, in which a vast plurality of semi-permeable hollow fibers formed in a bundle are diagonally disposed in a housing with surplus in length so that the ends of the bundle may direct oppositely downward and upward, respectively, and a dialyzate intake and exit are provided in such positions that flow of the dialyzate may effectively traverse the bundle of hollow fibers. With this haemodialyzer, the bundle of the hollow fibers can be sufficiently expanded to spacingly spread the hollow fibers in the housing to attain good contact with the dialyzate and enhance the haemodialysis efficiency, and the priming and blood recovery operations are much facilitated.

6 Claims, 6 Drawing Figures

HAEMODIALYZER EMPLOYING HOLLOW FIBERS

This invention relates to a haemodialyzer employing a vast plurality of semi-permeable hollow fibers.

Artificial kidneys of high efficiency which are simplified in operation and can reduce a time required for haemodialysis operation are really awaited by those who are suffering from renal failure. The artificial kidney or haemodialyzer apparatus is generally constructed by a haemodialyzer and a haemodialysis equipment on which the haemodialyzer is mounted.

A typical conventional haemodialyzer employing hollow fibers has such a structure of so-called heat exchanger type as disclosed in Japanese Patent Application Publication No. 28625/1964 wherein a plurality of hollow fibers are arranged in parallel to form a bundle and encased in a cylindrical housing, and bonded at their end portions in liquid-tight connection. In the haemodialyzer of this type, the plurality of hollow fibers are disposed densely in the housing and a dialyzate is adapted to pass through the spaces between the fibers at a flow rate of about 500 ml/min to effect mass transfer from blood to the dialyzate through the membranes of the hollow fibers. In haemodialyzers, the dialyzate is generally desired to contact uniformly and intimately each of the hollow fibers so that good mass transfer efficiency can be attained. With the haemodialyzers of this type, however, contact of the dialyzate with the hollow fibers is delicately influenced by (1) spread of the fibers, (2) shape of a dialyzate intake or a baffle board, or (3) flow rate of the dialyzate. For this reason, good mass transfer efficiency is not always achieved. For example, when the spread of the hollow fibers is not uniform and irregularly thin and thick portions are formed locally, the dialyzate is liable to flow through the thin portions with ease, preventing effective contact with the fibers at other portions, where mass transfer is not conducted sufficiently. Further, since the hollow fibers are generally gathered to form a bundle of cylindrical shape, the dialyzate fed laterally is hard to flow into the interior of the bundle, causing differences in flow speed between the peripheral and interior portions of the bundle.

In general, a haemodialysis equipment is classified into three types, according to modes of supply and circulation of the dialyzate, namely, (1) single pass type, (2) partial recirculation type and (3) batch type. The conventional haemodialyzers employing hollow fibers as mentioned above are adapted to be used in the haemodialysis equipment of single pass type and difficult to be used in the equipment of partial recirculation type in which the dialyzate is circulated at a rate of 10 to 60 liters/min. When the dialyzate passes at a high flow rate through the spaces between the hollow fibers which are densely packed in the housing, the pressure of the dialyzate increases to prevent ultrafiltration with the hollow fibers.

In this connection, it is to be noted that the characteristic feature of the haemodialysis equipment of partial recirculation type is that the dialyzate supplied, for example at a rate of 500 ml/min is repeatedly recirculated to pass over the dialysis membranes at a flow rate of 10 to 60 liters/min and that the film resistance on the dialyzate side of the mass transfer is reduced (in other words, the thickness of a laminar sublayer formed in molecule diffusion area is decreased) since the dialyzate passes over the dialysis membranes at a higher flow rate. For the equipment of partial recirculation type, a haemodialyzer of coil-type which comprises tubular membrane wound in coil has generally been employed heretofore. Such coil-type haemodialyzer employing a tubular membrane, however, is inevitably accompanied by such drawbacks that if the tubular membrane is broken even at one small portion, a large amount of the blood flowing in the tube will vigorously spout out and that it takes a relatively long time for the haemodialysis treatment because the coil-type haemodialyzer of one tube membrane structure can provide only a small dialysis area and there is needed a large priming volume.

As one measure for eliminating the above-mentioned drawbacks of the coil-type haemodialyzer, there has been proposed a haemodialyzer apparatus employing hollow fibers and having the characteristic feature of the partial recirculation structure (German Laid-Open Specification No. 25 39 574). With the proposed apparatus, not only a priming volume therefor can be reduced but also a dialysis area is largely increased. Accordingly, it can provide relatively high dialysis efficiency for its priming volume and it successfully curtails a time required for haemodialysis. However, it has turned out that the haemodialyzer apparatus of this type has still some drawbacks. That is, (1) it takes a considerable time to fill up the inside of hollow fibers with physiologic saline (priming operation) and (2) it is difficult to take or recover blood out of the haemodialyzer apparatus and the blood is liable to remain inside the hollow fibers.

It is therefore an object of the present invention to provide a haemodialyzer which is applicable to a haemodialysis equipment of partial recirculation type and can eliminate the drawbacks of the conventional haemodialyzers.

It is another object of the present invention to provide a haemodialyzer which can facilitate a priming operation and a blood recovery operation from the inside of hollow fibers by so arranging the hollow fibers that the both terminal ends of a bundle of hollow fibers are directed oppositely upward and downward, respectively and the sections of the ends of the bundle are kept in a horizontal plane.

It is a further object of the present invention to provide a haemodialyzer which can enjoy a high haemodialysis efficiency owing to its structure wherein the bundle of hollow fibers are expanded intermediate the ends to spacingly spread the fibers.

It is a still further object of the present invention to provide a haemodialyzer which is so adapted that a dialyzate flows with ease at a high flow rate through the spaces between the spread fibers at the expanded portion of the bundle.

It is a still further object of the present invention to provide a haemodialyzer which has a large dialysis area but a small priming volume.

It is a still further object of the present invention to provide a haemodialyzer which can complete the haemodialysis in a shortened time to reduce a burden of a patient.

According to the present invention, there is provided a haemodialyzer which comprises: (a) a housing having a top and bottom face connected by a sidewall structure, (1) said top and bottom face each having respective openings with the center axes laterally staggered from each other, (2) a lower portion of said housing, including said bottom face and part of said sidewall structure, having a dialyzate intake which opens inside the housing to release the dialyzate into a passage defined by the inner face of the housing, (3) an upper portion of said housing, including said top face and part of said sidewall structure, having a dilyzate exit for collecting the dialyzate to flow out of the housing, (4) said dialyzate intake and exit being in a positional relation that they locate on the opposite sides of a line connecting said openings of top and bottom face of the housing; (b) a vast plurality of semi-permeable hollow fibers substantially equal in length, and gathered and bonded at their both end portions to form a bundle, the bundle of hollow fibers being fixedly held, at its both ends, in liquid-tight connection, in the openings of the top and bottom face of the housing, respectively, and disposed, with surplus in length with respect to the distance in straight line between the opening of the top face and the opening of the bottom face in the passage defined by the inner face of the housing; and (c) an inlet and outlet for blood formed in association with the respective end portions of the fiber bundle.

The invention will be better understood from the following description taken in connection with the accompanying drawings in which.

Figure 1:
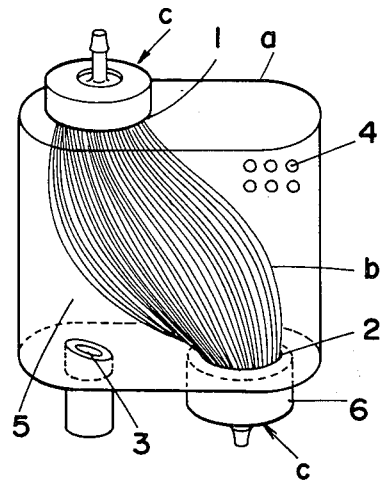
FIG. 1 is a perspective view of one form of haemodialyzer according to the present invention.

Referring now to the drawings, there are illustrated haemodialyzers according to the present invention and a haemodialyzer apparatus incorporating therein the haemodialyzer.

Figure 2:
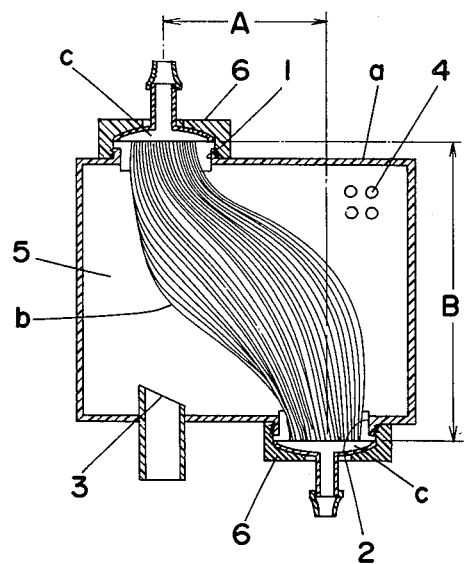
FIG. 2 is a vertical sectional view of the haemodialyzer shown in FIG. 1.

A housing $a$ has a top and a bottom face connected by a sidewall structure and adapted to contain a bundle $b$ of semi-permeable hollow fibers to effect haemodialysis therein. In the embodiments as shown in FIGS. 1 to 4, the housing $a$ is made of a transparent plastics material. Openings 1 and 2 are formed at the top and the bottom face, respectively, and located so that their center axes may be staggered from each other by a distance of A as indicated in FIG. 2. A distance between the levels of the two openings 1 and 2 is designated by B in FIG. 2. The stagger is determined in relation with the distance A. A stagger rate is defined by $$(A/B \times 100 \, (\%)).$$

In the present invention, the stagger rate is larger than 0% and smaller than 150% and ranges preferably from 15% to 150%. In case the stagger rate is 150% or more, the fiber bundle $b$ disposed between the openings 1 and 2 comes to assume a horizontal line, which is not desirable for priming operation and recovery of blood. This positional relation is advantageous to sufficiently expand the hollow fiber bundle $b$, spreading the hollow fibers spacingly in the housing as explained hereinafter in detail.

An intake 3 for introducing a dialyzate into the housing $a$ is provided at a lower portion of the housing, including the bottom face and part of the sidewall structure and opens inside the housing $a$ at its lower portion to release the dialyzate into a passage 5 defined by the inner face of the housing $a$. An exit 4 for collecting the dialyzate to flow out of the housing $a$ opens at an upper portion of the housing, including the top face and part of the sidewall structure. The intake 3 and the exit 4 are advantageously located on the opposite sides of the hollow fiber bundle $b$, respectively, so as to be located substantially symmetrically with reference to the length of the fiber bundle $b$ mounted in the housing $a$ to afford to the fibers good contact with the dialyzate. It is advantageous to locate the dialyzate intake under the opening 1 on the top face and to locate the dialyzate exit over the opening 2 on the bottom face. Differently stated, it is desirable for obtaining high dialysis efficiency that the dialyzate intake 3 is provided in the vicinity of an extension of the axis of the opening 1 and the dialyzate exit 4 is provided in the vicinity of an extension of the axis of the opening 2 so that the flow of dialyzate can operatively traverse the fiber bundle $b$.

The bundle $b$ is composed of a vast plurality of hollow fibers made of semi-permeable membrane and substantially equal in length. The end portions of the hollow fibers are gathered to form a bundle and bonded in a liquid tight connection. The thus formed bundle $b$ is fixedly held at its both ends in the openings 1 and 2, respectively, to be disposed with surplus in length with respect to the distance in straight line between the opening 1 and the opening 2, in the passage 5 for the dialyzate defined by the inner face of the housing $a$.

To mount the fiber bundle $b$ in the housing $a$ with surplus in length, the fibers must be longer than the distance in a straight line between the opening 1 and the opening 2. A surplus rate is defined as follows:

$$\text{Surplus rate (\%)} = \left( \frac{L}{\sqrt{A^2 + B^2}} - 1 \right) \times 100$$

wherein

L: actual length of hollow fiber in haemodialysis operation

A: staggering distance between the center axes of openings 1 and 2

B: distance between the levels of two openings 1 and 2

Stated illustratively, it is recommended to determine the surplus rate, with due regard to possible variation in length, so as to keep a surplus rate of 2% or more in dialysis operation. In case the surplus rate is less than 2%, the fiber bundle $b$ cannot expand sufficiently and accordingly the dialyzate does not well flow into spaces between the fibers. However, it is not advantageous that the surplus rate is too large for the flow of blood inside the hollow fibers to continually or continuously descend. The flow of blood inside the hollow fibers my be horizontal at some portions in its course as far as it descends as a whole. It is desired to avoid a structure in which the downward direction of blood flow is reversed to the upward direction during the flow of blood from the opening 1 to the opening 2. In other words, the fiber bundle $b$ is desired to be disposed in the housing $a$ so that each of the fibers may form a line continuously or continually descending from the opening 1 to the opening 2. If such too a large surplus rate is given, it is difficult to thoroughly return blood inside the hollow fibers to a patient and liable to leave the blood in the hollow fibers. An optimum surplus rate is determined in the range as specified above, taking into consideration properties of hollow fiber materials employed.

A preferred mode of disposition of hollow fibers is shown in the drawings wherein the fibers spacingly spread in the lateral direction of the bundle $b$ and the bundle $b$ expands intermediate the ends. This expansion in the lateral direction of the bundle $b$ is attained by combination of the specific positional relation to openings 1 and 2 staggered with their center axes and the specific surplus rate of hollow fibers. It is easily understandable that this large lateral expansion of the bundle $b$ is not obtained with a structure where the fibers are disposed with surplus in length but without stagger of the openings 1 and 2, to wit when the openings 1 and 2 are disposed in alignment with each other.

As hollow fibers of semi-permeable membrane, there may be employed any of known hollow fibers ordinarily employed for heamodialyzer, such as those made of regenerated cellulose, cellulose acetate, polyacrylonitrile, polymethyl methacrylate and other materials having semi-permeable characteristics.

The end portions of the fiber bundle $b$ are gathered and bonded with an adhesive and liquid-tightly and fixedly held in the openings 1 and 2 with nozzle caps 6, respectively. As the adhesive to be used for bonding of end portions of the bundle $b$ there may be employed known organic adhesives, such as polyurethane resins, silicone resins, epoxy resins, or the like. However, it is necessary to use an adhesive having no tendency to coagulate blood and no toxicity when in contact with blood.

An inlet and outlet $c$ for introducing and taking out blood, respectively are formed by the opening ends of the fiber bundle $b$ and the nozzle caps 6. Generally, blood pipes are connected liquid-tightly to the blood inlet and outlet $c$, respectively.

Figure 3:
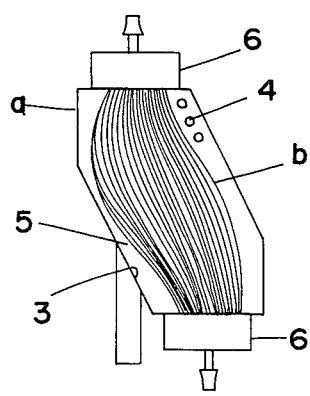
FIG. 3 is a plan view of another form of haemodialyzer according to the present invention.
Figure 4:
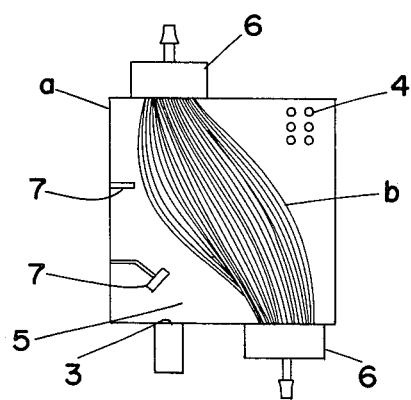
FIG. 4 is a similar plan view of still another form of haemodialyzer according to the present invention, with baffle boards provided therein.

In case the haemodialyzer of the present invention is applied to a haemodialysis equipment of partial recirculation type, the dialyzate recirculated at a flow rate of 10 to 30 liters/min is liable to flow to the lower resistance region, unless the flow is regulated, preventing effective contact of the dialyzate with the whole hollow fibers. In FIGS. 1 and 2, the dialyzate is jetted toward the interior of the fiber bundle $b$ from the dialyzate intake 3 which opens just below the fiber bundle $b$ facing it. FIG. 3 shows another form of haemodialyzer according to the present invention, wherein the housing $a$ is so configured that a dead space between the bundle $b$ and the housing $a$ is minimized. With this structure, flow of the dialyzate is regulated so as to effectively traverse the hollow fibers to attain good contact between the fibers and the dialyzate. FIG. 4 is a further form of haemodialyzer according to the present invention, wherein baffle boards 7 are provided to regulate the flow of dialyzate to direct it toward the interior of the bundle $b$. In the haemodialyzer of FIG. 4, the opening of the intake 3 is even with the bottom face of the housing $a$ as different from the other embodiments and the dialyzate tends to diverge at the opening and is difficult to flow effectively toward the fiber bundle $a$. For this particular structure of the intake 3, it is recommended to guide with aid of the baffle boards 7 the flow of dialyzate toward the bundle $b$ so as to attain good contact with each of the hollow fibers.

In the thus constructed haemodialyzer of the present invention, blood is introduced into the inside of the hollow fibers and the dialyzate is flowed through the passage 5 in the housing $a$ so that the dialyzate introduced flows through the spaces between the hollow fibers spacingly spread in the passage 5 and can contact uniformly and intimately with each of the hollow fibers to provide high dialysis efficiency. Further, the passage for blood assumes a form of gentle line in the present haemodialyzer and the blood in the hollow fibers can be easily recovered after completion of the haemodialysis.

Figure 5:
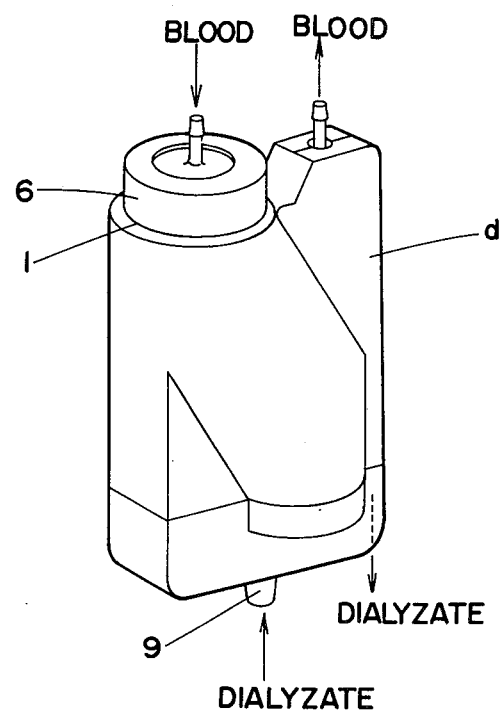
FIG. 5 is a perspective view of a haemodialyzer designed in the form of a cartridge and constructed by incorporating therein a haemodialyzer similar to the haemodialyzer shown in FIG. 3.
Figure 6:
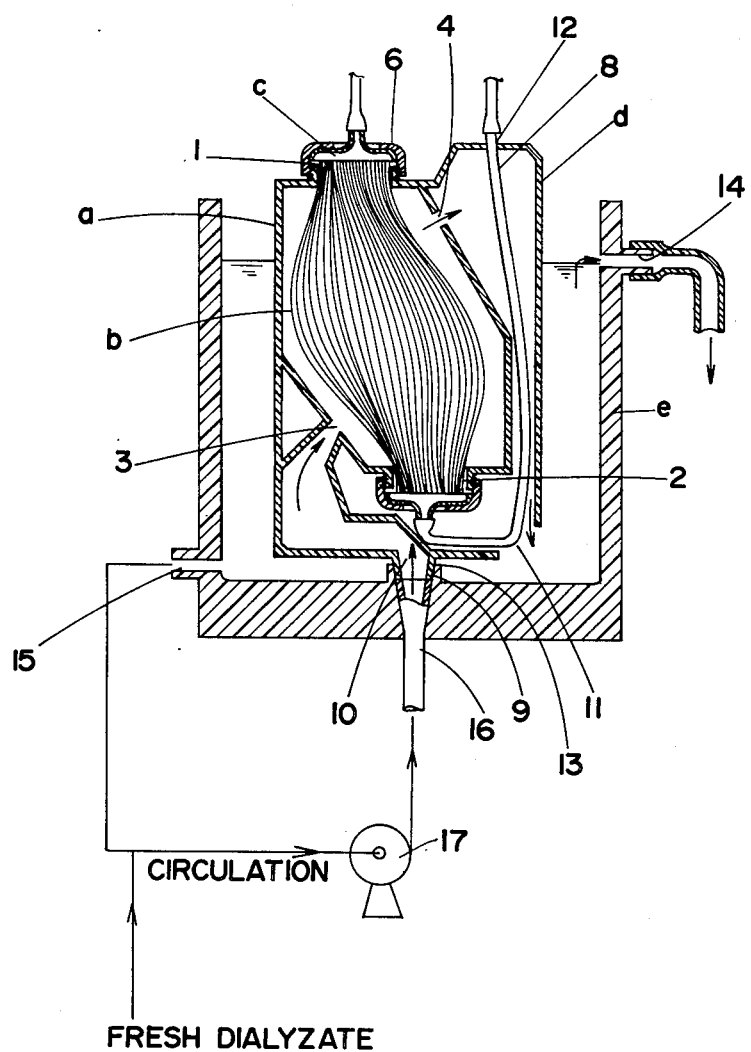
FIG. 6 is a haemodialyzer apparatus with the cartridge of haemodialyzer shown in FIG. 5 incorporated therein.

FIG. 5 is a perspective view of a cartridge $d$ of heamodialyzer incorporating therein a haemodialyzer similar to the haemodialyzer shown in FIG. 3 and adapted to be practically used with a haemodialysis equipment as shown in FIG. 6 (in FIG. 5, the inside structure is omitted). This cartridge $d$ is so constructed as to be accommodated in a canister $e$ through engagement of an opening projection 9 provided at the bottom of the cartridge $d$ with an opening 13 of the canister $e$ and communicated with an introduction pipe 16. The cartridge $d$ has a dialyzate passage which emanates at 10 and communicate with the dialyzate intake 3 of the housing $a$. A blood pipe 8 connected to the nozzle cap 6 of the blood outlet $c$ is encased in the cartridge $d$ at its mantle portion which is provided outside the housing $a$ and led out of the cartridge $d$ through an opening 12. The mantle portion communicates with the inside of the housing $a$ through the exit 4 and opens at 11. The canister $e$ has a dialyzate discharging opening 14 at its upper portion for letting the dialyzate overflow and an opening 15 at its lower portion for letting the dialyzate flow out of the canister $e$ to be recirculated at a flow rate of 10 to 30 liters/min by a pump 17 while being supplied with fresh dialyzate at a flow rate of 500 ml/min.

In the thus constructed haemodialyzer apparatus; the flow of dialyzate forms a circuit as follows: introduction pipe 16 → opening 10 → path in cartridge $d$ → intake 3 → passage 5 in housing $a$ trversing hollow fibers → exit 4 → mantle portion → opening 11 → opening 15 (while the dialyzate is partially discharged) → introduction pipe 16.

For demonstrating the excellent effectiveness of the haemodialyzer of the present invention over that of German Laid-Open Specification No. 25 39 574, comparison is given as follows.

Comparison in feasibleness of operation between haemodialyzer of present invention and haemodialyzer of German Laid-Open Specification No. 25 39 574

| Operation | haemodialyzer of present invention | haemodialyzer of German Laid-Open Specification No. 25 39 574 |
| --- | --- | --- |
| priming with physiologic saline (conducted under the same conditions) | can be carried out in a state that the haemodialyzer is set in a holder. required time: about 10 min | must be carried out by holding the haemodialyzer with hands and turn it upside down in the course of the operation. required time: about 15 min (It takes considerable time to degas.) |
| recovery of blood (by introducing physiologic saline into hollow fibers to return blood to a patient after completion of | can be carried out while keeping the haemodialyzer in a canister (in the same state as of dialysis operation.) required time: | must be carried out by removing the haemodialyzer out of a canister and manually turning it upside down. required time: about 20 min |

| -continued | |
|---|---|
| Comparison in feasibleness of operation between haemodialyzer of present invention and haemodialyzer of German Laid-Open Specification No. 25 39 574 | |
| Operation | haemodialyzer of present invention | haemodialyzer of German Laid-Open Specification No. 25 39 574 |
| haemodialysis | about 5 min | |

EXAMPLE 1

A haemodialyzer as shown in FIGS. 1 and 2 was prepared by using 12,000 of cellulose hollow fibers prepared according to the cuprammonium process and having an inner diameter of 260 μ and an outer diameter of 300 μ. The surplus rate of the fibers disposed in the housing $a$ was 5.0% which was calculated assuming that the shrink of the fibers was zero and the stagger rate was 27%. The effective membrane area was 1.68 m².

As a model blood, an aqueous solution having a urea concentration of 1 g/liter was caused to flow at a flow rate of 200 ml/min. A dialyzate of ion exchange-treated water was circulated at a flow rate of 10 liters/min outside the hollow fibers, while being supplied with fresh one at a flow rate of 500 ml/min and discharging the dialyzate at the same flow rate. The dialysis was conducted to 37° C. The urea removal rate as determined with respect to the urea solution sampled at the urea solution exit when 6 minutes had passed from the start of the experiment was found to be 64.3%.

For comparison, substantially the same dialysis as described above was repeated except that a haemodialyzer in which the hollow fibers were disposed straightly (without stagger between the center axes of the openings 1 and 2 and without surplus in length) was employed. The urea removal rate was as low as 47.1%.

EXAMPLES 2 and 3

Haemodialyzers as shown in FIGS. 1 and 2 were prepared by using the same hollow fibers as were used in Example 1, with a surplus rate of 5% and stagger rates of 15% and 70%, respectively. The dialysis was conducted under the same conditions as employed in Example 1. The urea removal rates after 6 minutes dialysis operation were 58.3% and 66.2%, respectively.

EXAMPLE 4

A haemodialyzer as shown in FIGS. 1 and 2 was prepared by using the same hollow fibers as were used in Example 1, with a stagger rate of 27% and surplus rate of 10.6%. The dialysis was conducted under the same conditions as employed in Example 1. The urea removal rate was 64.3%. However, with the haemodialyzer having a surplus rate of 10.6%, the bundle of hollow fibers assumed a so-called form of stomach in gastroptosis (in which the downward direction of blood flow is reversed to the upward direction in the course of flow of blood) and there was caused some problem in durability of the bundle of hollow fibers as well as the priming operation.

What is claimed is:
1. A haemodialyzer which comprises:
  (a) a housing having a top and bottom face connected by a sidewall structure,
  (1) said top and bottom face each having respective openings with the center axes laterally staggered from each other,
  (2) a lower portion of said housing including said bottom face and part of said sidewall structure, having a dialyzate intake which opens inside the housing to release the dialyzate into a passage defined by the inner face of the housing,
  (3) an upper portion of said housing, including said top face and part of said sidewall structure, having a dialyzate exit for collecting the dialyzate to flow out of the housing,
  (4) said dialyzate intake and exit being in a positional relation that they locate on the opposite sides of a line connecting said openings of top and bottom face of the housing;
  (b) a vast plurality of semi-permeable hollow fibers substantially equal in length, and gathered and bonded at their both end portions to form a bundle, the bundle of hollow fibers being fixedly held, at its both ends, in liquid-tight connection, in the openings of the top and bottom face of the housing, respectively, and disposed, with surplus in length with respect to the distance in straight line between the opening of the top face and the opening of the bottom face, in the passage defined by the inner face of the housing so that the hollow fibers each form a line continually descending from said opening of the top face to said opening of the bottom face, while spacingly spreading to expand the bundle, intermediate the ends, in its lateral direction; and
  (c) an inlet and outlet for blood formed in association with the respective end portions of the fiber bundle.

2. A haemodialyzer as set forth in claim 1, wherein said dialyzate intake is located under the opening of the top face and said dialyzate exit is located over the opening of the bottom face of the housing.

3. A haemodialyzer as set forth in claim 1, which further comprises one or more baffle boards for regulating the flow of dialyzate to cause the dialyzate to flow uniformly over the hollow fibers.

4. A haemodialyzer as set forth in claim 1, wherein the distance that the center axes of the respective openings of said top and bottom faces are laterally staggered from each other is greater than 0% and less than 150% of the distance between the levels of said openings.

5. A haemodialyzer as set forth in claim 4, wherein the distance that the center axes of the respective openings are staggered from each other is from 15% to less than 150% of the distance between the level of said openings.

6. A haemodialyzer as set forth in claim 1, having a surplus rate of 2% or more, the surplus rate in percentage being defined by the formula:

$$\left(\frac{L}{\sqrt{A^2+B^2}}-1\right)\times 100;$$

where
  L is the length of each of said semi-permeable hollow fibers,
  A is the distance that the center axes of the respective openings of said top and bottom faces are laterally staggered from each other, and
  B is the distance between the level of said respective openings.